United States Patent [19]

Johnson

[11] 3,867,975

[45] Feb. 25, 1975

[54] TIRE CHANGING TOOL

[76] Inventor: George Howard Johnson, 1045 Red Bird Rd., Augusta, Ga. 30904

[22] Filed: Feb. 23, 1973

[21] Appl. No.: 335,066

[52] U.S. Cl............................ 157/1.2, 157/1.24
[51] Int. Cl. ..................................... B60c 25/06
[58] Field of Search .......... 157/1.2, 1.22, 1.24, 1.17

[56] References Cited
UNITED STATES PATENTS

| 1,587,634 | 6/1926 | Dickey et al. | 157/1.22 |
| 1,720,615 | 7/1929 | Welch | 157/1.24 |
| 2,482,789 | 9/1949 | Moore | 157/1.24 |
| 2,595,258 | 5/1952 | Hildred | 157/1.2 |
| 3,037,549 | 6/1962 | Jacobson | 157/1.22 |

FOREIGN PATENTS OR APPLICATIONS

| 603,787 | 6/1948 | Great Britain | 157/1.22 |

Primary Examiner—Al Lawrence Smith
Assistant Examiner—Harold P. Smith, Jr.
Attorney, Agent, or Firm—James A. Hinkle

[57] ABSTRACT

A tool for mounting and dismounting a tire upon small diameter wheel rims of either fixed or open hub types, wherein the tool has a vertically disposed changer stand with a horizontally disposed hub plate to receive the wheel rim with sufficient lug receiving apertures to mate with all types of small wheels. A center bolt assembly projecting from the hub plate engages a bead roll bar which forces the tire onto the wheel. A bead breaking assembly is disclosed to break the bead of a tire with the rim, and includes a power applicator and a bead breaking ring. The invention is designed for use with such wheels as fit upon lawnmowers, golf carts, small tractors, boat trailers and certain industrial equipment.

2 Claims, 6 Drawing Figures

TIRE CHANGING TOOL

This invention relates in general to a device for removing and replacing a tire on a vehicle rim, and more particularly to a device adapted to be used with small wheels with either fixed or open hubs.

In prior art devices for effecting the removal or replacement of a tire on a wheel the devices were constructed in such a manner as to prohibit their operation with small types of wheels that are normally found on lawnmowers, golf carts, small tractors, boat trailers and certain industrial equipment. Normally the prior art devices will not properly function on wheels having a diameter of less than 16 inches and almost certainly will not operate on the so-called fixed hub type of wheel where the bearing is integral with the wheel and where there are no lug holes. One reason that the prior art devices will not function on small wheels and fixed hubs is that the center post used with these devices is of such a size that it will not fit in a fixed hub. Even on the open hub type of wheel the prior art devices will not operate because they are normally not constructed to function with wheel diameters of less than 8 inches. In addition, the prior art devices are of such a size as to take up an inordinate amount of room in a normal shop dealing with small wheels as to make these devices impractical.

Therefore, an object of this invention is to provide a new and improved tire mounting tool of simple and inexpensive construction and operation for use particularly with the small type wheels, but being equally adapted for use with other types of wheels as well.

Another oject of this invention is to provide a device for removing a tire from a rim and replacing the tire on the rim with a minimum amount of time and effort and with a complete elimination of any damage or injury to the tire and rim.

Yet another object of the invention is to provide a tire changing apparatus which is equally adapted to operate on both fixed hubs and open hubs.

Still another object of the invention is the provision of a tire changing apparatus which will operate on various diameter wheels of either the drop center construction or with wheels having two halves.

A further specific object of the invention is to provide a tire changing apparatus which will work equally well to mount or dismount tires having a diameter of between 4 inches and 12 inches with either wide or narrow profile tires mounted on various types of hubs, whether fixed or open with a drop center or being in two halves or on wide hubs such as found on golf cart wheels.

Other objects and the nature and advantages of the instant invention will be apparent from the following description taken in conjunction with the accompanying drawing herein:

Figure 4:
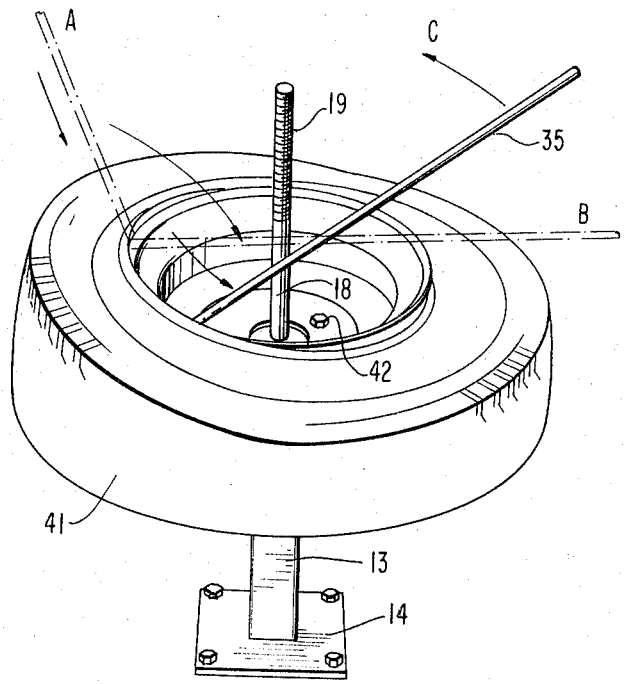
Figure 5:
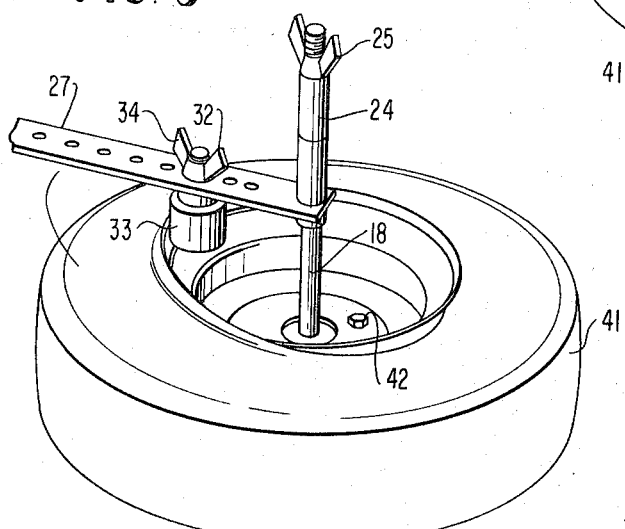
Figure 6:
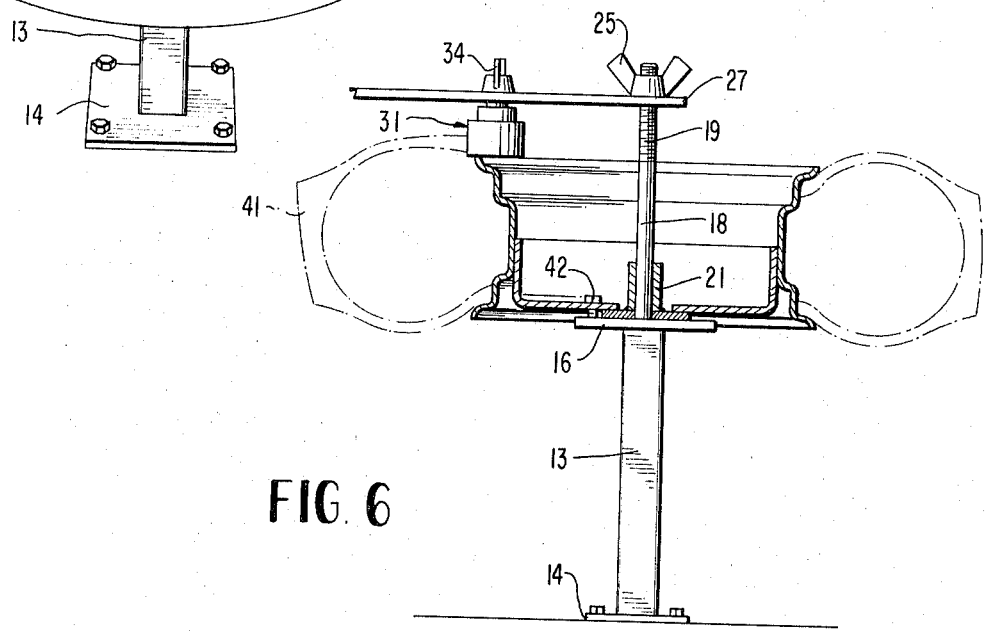

FIG. 4 indicates the preferred method of lifting the bead from a wheel rim;

FIG. 5 shows a preferred method of mounting a tire utilizing the present invention; and FIG. 6 is a vertical section view of the invention being utilized to mount a tire upon a wide hub wheel.

Figure 1:
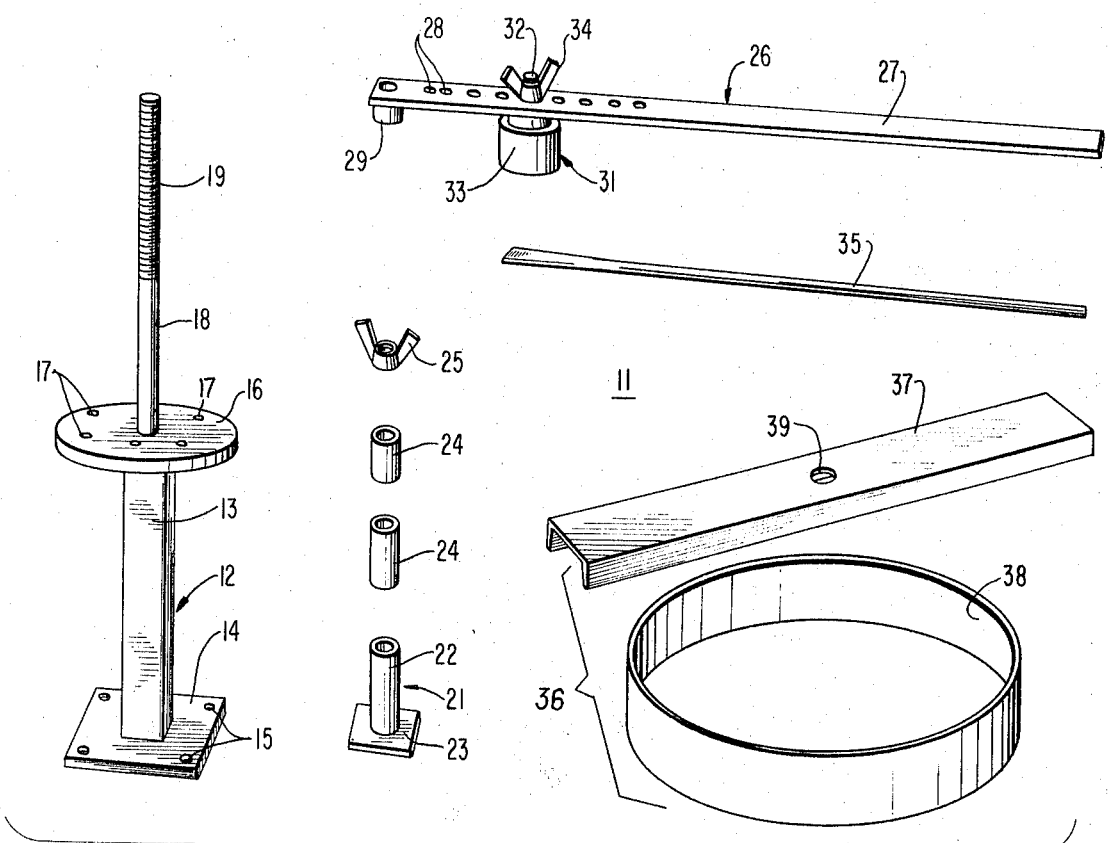
FIG. 1 is an exploded perspective view of the various parts of the instant invention.

Referring to the drawings wherein like reference characters designate corresponding parts throughout the several figures, the present invention is shown in a perspective view in Figure 1 and is generally indicated by numeral 11. The basic piece of the invention is a changer stand 12 which generally comprises a thickened rectangular shaped center post 13 having at its lower end a base plate 14.

The base plate 14 is of sufficient size to support the entire changer stand and has, at intervals about its periphery, apertures 15 which are used to secure the stand 12 to a work bench or similar type bench.

Located in a horizonally disposed relationship with respect to the top of the center post 13 is a hub plate 16 of circular configuration which is so designed as to be of universal size. The reason that the hub plate 16 is of universal size is due to the fact that there are a plurality of more or less randomly disposed apertures 17 through its surface and these apertures are designed to mate with lug bolt apertures through a variety of different types of wheel flanges. It is common knowledge in the industry that certain wheels will have four, five or more lug bolt spertures through the inside flanges by which the wheel may be attached to the vehicle upon which it is used. When changing a tire it is preferable to fixedly secure the wheel to the changer stand 12, and to do this at least two lug bolt apertures of the wheel must match up with at least two of the apertures on the hub plate 16. The apertures 17 may or may not be threaded as desired. However, from common practice it has been found that there is no particular need to thread the apertures as two lug bolts projecting through the apertures will secure the wheel to the hub plate 16 securely enough to perform the tire changing operation.

Projecting verticially at a perpendicular angle to the hub plate 16 is a center bolt assembly 18 whose distal portion is threaded as indicated by numeral 19. Other portions of the invention which are specifically utilized with center bolt assembly 18 include a center bolt adaptor 21 which includes an elongated tubular portion 22 and a base portion 23 which has a matching aperture therein (not shown) aligned with the aperture of the tubular portion 22. Additional spacers 24 are provided for use in conjunction with the center bolt assembly 18 for a purpose which will be later described. The spacers 24 are of a tubular design and adapted to fit over the center bolt assembly. A wing nut 25 is threaded in its internal portion for cooperation with the threads 19 of the center bolt assembly by which the spacers and other members of the invention may be secured upon the center bolt assembly when desired.

The means by which a tire is replaced upon a wheel rim is shown as a roll bar 26 which includes an elongated handle 27 having a plurality of apertures 28 at the distal end thereof to conform the roll bar to various wheels diameters as will be later described. At the most distal portion of the roll bar 26 is a bushing 29 adapted to be rotatably secured upon the center bolt assembly 18. Adapted to be disposed through one of the apertures 28 is a bead roll assembly 31 which includes a threaded bolt 32 upon which the bead roll 33 is rotatably secured by means of suitable bearings (not shown). In order to maintain the bead roll assembly on the roll bar 26 there is provided a threaded wing nut 34.

It should be noted that the bead roll 33 is freely rotatable about the bolt 32 so that when the roll bar 26 is engaged about the center bolt assembly and the bead roll assembly is placed in contact with the bead of a tire to be mounted upon a rim, movement of the roll bar in a circular manner will allow the bead roll assembly to rotate freely against the tire. The operation of the entire invention will be later described.

To enable the operator of the invention to lift the tire bead portion from the wheel rim, a bead lifting rod 35 is provided which is generally an elongated tubular rod with a flattened end portion. It is generally known that when a tire is to be removed from a wheel, and especially after it has been mounted for an extended period, the tire tends to be secured to the rim by adhesive action. Frequently, some means must be provided to break the seal of the bead from the rim in order to remove the tire. The present invention contemplates a bead breaking assembly 36 which includes a power applicator 37 and a bead breaker ring 38. The power applicator 37 is generally a channel beam member having a central aperture therein indicated by numeral 39. The bead breaker ring 38 is a circular member which is of such a diameter as to effectively lay against the bead of the particular tire sought to be removed from a rim. Obviously, such a ring would normally come in various diameters to match with tires having various diameters.

Figure 3:
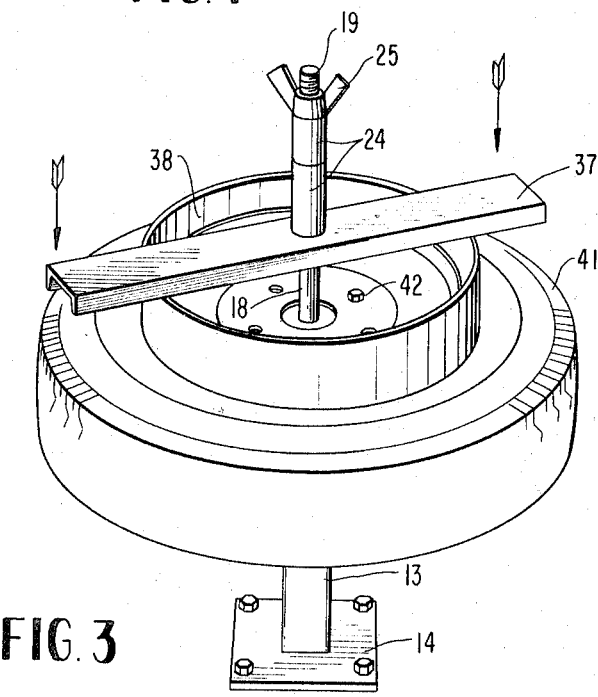
FIG. 3 shows a perspective view of a means utilized by the present invention for breaking the bead of a tire from its rim.
Figure 2:
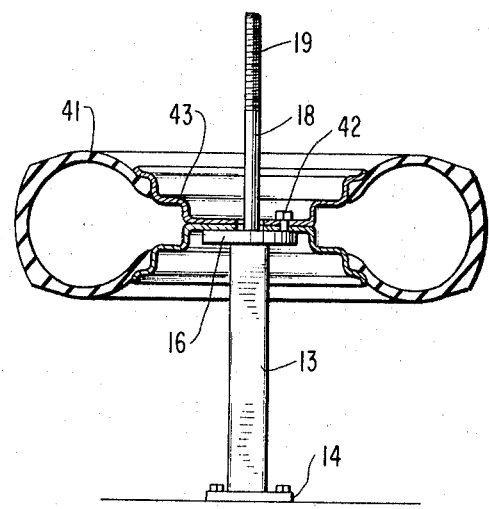
FIG. 2 shows a vertical section of a drop center type open hub with a tire mounted thereon being secured to the center post portion of the present invention.

Referring now to FIGURE 3, wherein the method of removing a tire 41 from a wheel 43 is shown, it is seen that the first step is normally the step of breaking the bead from the wheel rim. To effect this the wheel is mounted upon the hub plate 16 by means of lug bolts 42 which match with at least two of the apertures 17. The operator then slips the power applicator 37 over the center bolt assembly 18 and then grasps the opposed ends of the power applicator and presses downwardly exerting great mechanical force against the tire bead, thereby disengaging it from the wheel rim.

Once the bead has been broken, the tire is then removed as shown in FIG. 4 by inserting the bead lifting rod 35 with its flat end between the tire bead and the wheel rim. Such a step is shown in phantom view by the letter A. The operator then forces the bead lifting rod 35 in an arc to a substantially horizonal position shown in phantom lines by the letter B. The next step would be to rotate the rod 35 as indicated in the full line drawing by maintaining its flattened end between the tire bead and the wheel rim and rotating the rod using the center post assembly 18 as the fulcrum. This procedure would be continued until the complete rotation is effected thereby lifting the entire tire bead over the wheel rim. The same procedure would be used to lift the bottom tire bead over the upper wheel rim if the entire is to be removed from the wheel.

Referring now to FIGURE 5, which shows the method of mounting a tire upon a rim, it is seen that from the drawing the tire has already been partially mounted for clarity of description. The roll bar 26 has been positioned over the center post assembly 18 and the bead roll assembly 31 has been inserted in the particular aperture 28 in the roll bar which most closely matches the diameter of the particular wheel being utilized so that the bead roll assembly lies in a position that covers the outermost portion of the wheel rim. Such a position is shown more clearly in FIG. 6. Located atop of the roll bar 26 are one or more of the spacers 24 which are secured against the roll bar by means of the wing nut 25. The purpose of the spacers 24 is to take up space between the roll bar and the wing nut to quickly aid the operator in setting up the device for tire removal or replacement. Also, downward pressure of some sort must be exerted against the roll bar so that it will maintain its position against the tire bead and the wheel rim when it is being rotated in a circular manner about the center bolt assembly 18 for positioning the tire on the wheel rim. Therefore, the spacers 24 are utilized to help the operator of the invention to effectively utilize his time by not having to screw the wing nut 25 down upon the center bolt assembly 18 more than just a very few turns. Once the assembly is set up to mount a tire as shown in FIGURE 5, the operator adjusts the bead roll assembly 31 upon the roll bar 26, to generally match with the diameter of the rim being employed. Once this is done and the bead roll assembly fits snugly within the bead of the tire, the operator merely rotates the roll bar in a 360° circle so that the bead roll assembly rotates around the inside of the bead of the tire and pushes it over and around the rim of the wheel, such as is shown in FIGURE 6. As was previously described, the bead roll assembly includes a rotatably mounted bead roll 33 to easily engage with the tire bead to prevent pinching, and to allow the roll bar to be rotated more easily.

At times as shown in FIG. 6, a very wide wheel is employed, which necessitates the mounting of the roll bar 26 in such a position as to be disposed very nearly to the top of the center bolt assembly 18. Consequently, when this is done and the operator operates the roll bar, there may develop on the center post assembly a bending moment at a point near the hub plate 16 which would possibly bend the entire assembly 18. Therefore, to prevent such an occurrence, the operator would slip the center bolt adaptor 21 over the center bolt assembly 18 before securing the hub to the hub plate 16. By using this method, the center post assembly 18 is strengthened at a point where the bending moment due to the rotational pressures of the roll bar are the greatest and will effectively prevent bending the center post assembly.

Although the invention has been described with respect to a preferred embodiment thereof, it is to be understood that it is not to be so limited since changes and modifications can be made to the disclosed embodiment which are within the full intended scope of this invention as described in the appended claims.

What is claimed is:

1. A tool for mounting and dismounting a tire upon small diameter wheel rims having center openings therein comprising; a changer stand having a center post to which a base plate is affixed at one end and a hub plate to the other end, the hub plate being affixed perpendicularly to the center post and having lug bolt locating apertures disposed in such a pattern as to fit a variety of wheel rims, a center bolt assembly secured to the hub plate along the longitudinal axis of the changer stand, a roll bar assembly comprising an elongated roll bar with proximal and distal ends wherein a bushing is located adjacent the proximal end and is rotatively disposed upon the center bolt assembly, the elongated roll bar having a plurality of locating apertures at predetermined points along the roll bar for adjustably mounting a bead roll assembly thereon, the bead roll assembly comprising a through bolt and a cylindrical roller rotatively mounted upon the through bolt, said bead roll assembly being selectively positioned between the distal and proximal ends of the roll bar assembly to operatively engage the bead portion of the tire engaging the wheel rim, reinforcing means removably associated with the center bolt assembly, said means including an adaptor having an elongated tubular portion which is capable of being placed about the center bolt assembly and located in close juxtaposition with the hub plate, an apertured base portion fixedly attached to one end of the tubular portion so that it lies adjacent to the hub plate whereby the elongated tubular portion of the adaptor cooperates with the base portion to reinforce the center bolt assembly.

2. A tool for mounting and dismounting a tire upon small diameter wheel rims having center openings therein comprising; a changer stand having a center post to which a base plate is affixed at one end and a hub plate to the other end, the base plate being adapted to be secured to a work surface, the hub plate being affixed perpendicularly to the center post and having lug bolt locating apertures disposed in such a pattern as to fit a variety of wheel rims, a center bolt assembly secured to the hub plate along the longitudinal axis of the changer stand, a bead breaker assembly comprising a power applicator having an elongated channel configuration, a breaker ring of circular ring-like construction, said breaker ring being disposed atop a tire being dismounted and juxtaposed to the tire bead, the power applicator being placed atop the breaker ring and about the center bolt assembly whereby, when power is applied in a direction along the longitudinal axis of the changer stand upon the power applicator, the breaker ring disengages the tire bead from the wheel rim, an elongated roll bar with proximal and distal ends wherein a bushing is located adjacent the proximal end and is rotatively disposed upon the center bolt assembly, a bead roll assembly selectively positioned between the distal and proximal ends of the roll bar assembly to operatively engage the bead portion of the tire engaging the wheel rim, the bead roll assembly comprising a through bolt and a cylindrical roller rotatively mounted upon the through bolt, the elongated roll bar having a plurality of locating apertures along the roll bar for adustably mounting the bead roll assembly thereon, reinforcing means removably associated with the center bolt assembly, said means including an adaptor having an elongated tubular portion which is capable of being placed about the center bolt assembly and located in close juxtaposition with the hub plate, an apertured base portion fixedly attached to one end of the tubular portion so that it lies adjacent the hub plate whereby the elongated tubular portion of the adaptor cooperates with the base portion to reinforce the center bolt assembly.

* * * * *